United States Patent [19]
Morita

[11] Patent Number: 5,881,212
[45] Date of Patent: Mar. 9, 1999

[54] PRINTING CONTROL METHOD AND SYSTEM

[75] Inventor: Hiroyasu Morita, Yokohama, Japan

[73] Assignee: Canon Kabushiki Kaisha, Tokyo, Japan

[21] Appl. No.: 845,194

[22] Filed: Apr. 21, 1997

[30] Foreign Application Priority Data

Apr. 26, 1996 [JP] Japan .................................. 8-108223

[51] Int. Cl.[6] ............................ G06F 15/00; G06K 1/00; B41B 15/00
[52] U.S. Cl. .......................... 395/112; 395/111; 395/114; 399/361
[58] Field of Search ..................................... 395/112, 114, 395/111; 358/296; 399/361, 403

[56] References Cited

U.S. PATENT DOCUMENTS 5,287,194  2/1994  Lobiondo ................................ 395/114
5,570,172  10/1996  Acquaviva ............................... 399/403
5,574,831  11/1996  Grenda ..................................... 395/104

*Primary Examiner*—Andrew W. Johns
*Assistant Examiner*—Monica S. Davis
*Attorney, Agent, or Firm*—Fitzpatrick, Cella, Harper & Scinto

[57] ABSTRACT

In a printing system including a faceup printer and a facedown printer, the faceup and facedown printers are paired to print one document. In this case, the document is printed by the faceup printer from the end to start of the document and by the facedown printer from the start to end thereof. Printing ends when one printer is to print a page being printed by the other printer. Therefore, even if the printing speeds of the two printers are different, the whole document can be printed most efficiently. Even for a system having a larger number of printers, printing can be efficiently performed by similarly pairing the printers.

19 Claims, 14 Drawing Sheets

PRINTING CONTROL METHOD AND SYSTEM

BACKGROUND OF THE INVENTION

1. Field of the Invention

The present invention relates to a printing control method and system and, more particularly, to a printing control method and system for printing a document of a plurality of pages by a plurality of printers.

2. Description of the Related Art

Normally in printing a document on a host computer, one printer is selected from printers usable for the host computer to perform printing. When a document is to be divided and printed by a plurality of printers, the document is divided at specific pages, and the respective divided portions are printed by all printers used for printing in the order of pages.

When, however, printing is to be performed by one printer though other printers are usable, printing processing cannot be performed at a speed higher than the speed of the printer used for printing. Also, when printing is to be performed by a plurality of printers, if the printing speeds of printers used for divisional printing are different from each other, it is difficult to optimally distribute the numbers of target printing pages to the respective printers.

When a failure such as an error or the absence of paper occurs in a certain printer, special processing is required to cause another printer to print pages assigned to the failed printer.

When pages which cannot be printed due to a failure are to be printed by another printer, they cannot be printed in a proper printing order and direction. For example, assume that a document of 100 pages is printed by two printers each by 50 pages. One printer stops due to the absence of paper upon printing of 30 pages. Even if the remaining 20 pages are printed by the other printer, the pages cannot be printed consecutively from the printed pages, and must be rearranged upon completion of printing.

SUMMARY OF THE INVENTION

The present invention has been made in consideration of the above prior art, and has as its first object to provide a printing system which optimally distributes the numbers of target printing pages in printing a document by a plurality of printers, and need not rearrange paper sheets upon completion of printing.

It is the second object of the present invention to provide a printing system in which, when a document is printed by a plurality of printers, and a failure occurs in any printer to stop printing, another printer automatically prints remaining pages, and printing processing is not influenced even when the printer that stopped recovers from the failure to restart printing.

It is the third object of the present invention to provide a printing system in which, when a document is to be printed by a pair of faceup and facedown printers, target printing pages are optimally distributed to the respective printers, and the pages need not be rearranged upon completion of printing, and in addition, when a failure occurs in either paired printer to stop printing, the other printer automatically prints remaining pages.

It is the fourth object of the present invention to provide a printing system in which, when a document is to be printed by a pair of faceup and facedown printers, pages printed by a printer which cannot constitute a pair of faceup and facedown printers need not be rearranged upon completion of printing.

To achieve the above objects, the present invention has the following aspects.

There is provided a printing control method of performing printing using at least one of a faceup printer for discharging a paper sheet with a printing surface facing up, and a facedown printer for discharging a paper sheet with a printing surface facing down, including a determination step of determining presence/absence of a usable pair constituted by one faceup printer and one facedown printer, a setting step of, when the usable pair exists, assigning target printing data to the pair, setting the faceup printer of the pair so as to perform printing in a descending order from a last page of the target printing data of the pair, and setting the facedown printer so as to perform printing in an ascending order from a first page of the target printing data of the pair, and an end determination step of determining that outputs printed by the paired faceup printer and facedown printer are consecutive, and ending printing.

There is provided a printing system for printing printing data using at least one of a faceup printer for discharging a paper sheet with a printing surface facing up, and a facedown printer for discharging a paper sheet with a printing surface facing down, comprising determination means for determining a presence/absence of a usable pair constituted by one faceup printer and one facedown printer, setting means for, when the usable pair exists, assigning target printing data to the pair, setting the faceup printer of the pair so as to perform printing in a descending order from a last page of the target printing data of the pair, and setting the facedown printer so as to perform printing in an ascending order from a first page of the target printing data of the pair, and end determination means for determining that outputs printed by the paired faceup printer and facedown printer are consecutive, and ending printing.

There is provided a storage medium storing a program which performs printing using at least one of a faceup printer for discharging a paper sheet with a printing surface facing up, and a facedown printer for discharging a paper sheet with a printing surface facing down, the program comprising determination means for determining presence/absence of a usable pair constituted by one faceup printer and one facedown printer, setting means for, when the usable pair exists, assigning target printing data to the pair, setting the faceup printer of the pair so as to perform printing in a descending order from a last page of the target printing data of the pair, and setting the facedown printer so as to perform printing in an ascending order from a first page of the target printing data of the pair, and end determination means for determining that printing data printed by the paired faceup printer and facedown printer are consecutive, and ending printing at a point.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodi

DETAILED DESCRIPTION OF THE PREFERRED EMBODIMENTS

[First Embodiment]

The first embodiment according to the present invention will be described in detail below with reference to the accompanying drawings.

Figure 1:
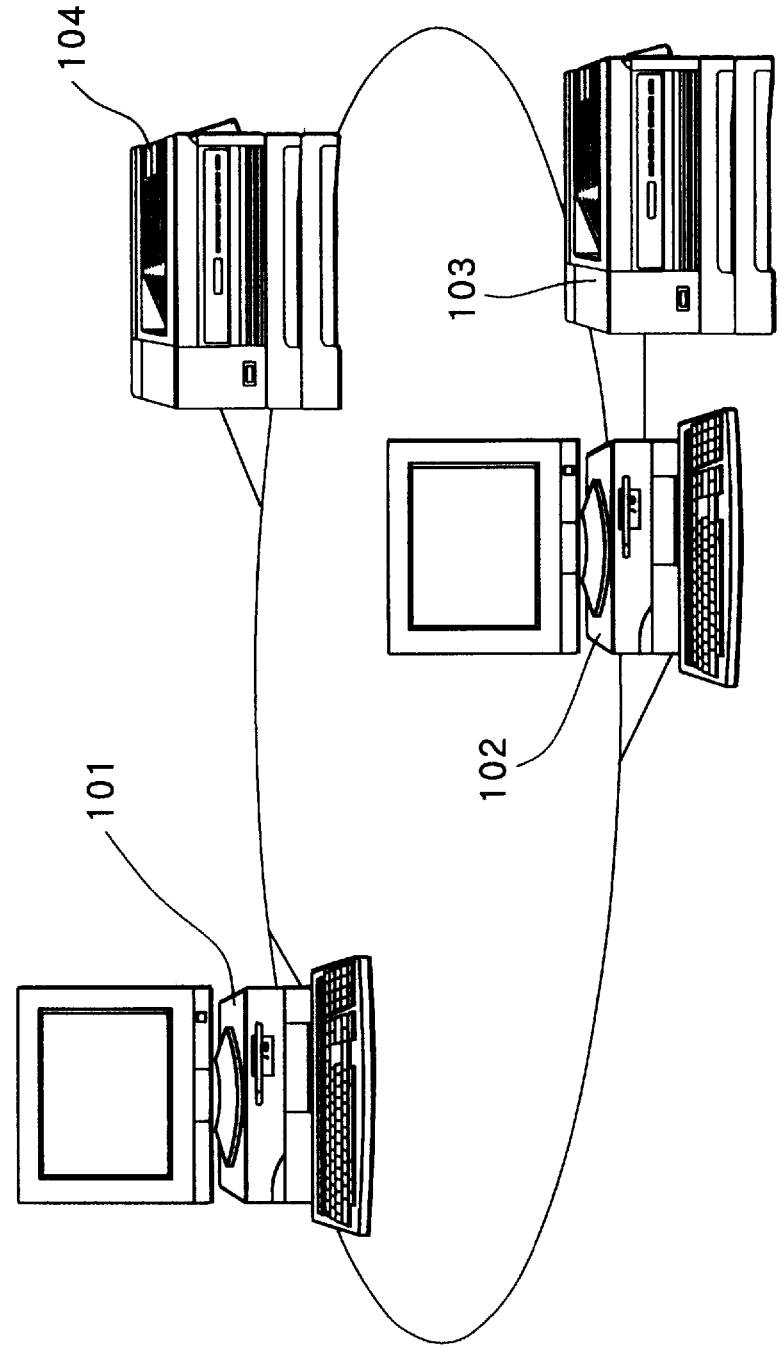
- FIG. 1 is a block diagram showing a system according to an embodiment of the present invention.

FIG. 1 is a block diagram showing a network system in this embodiment.

In this system, a client computer 101, a print server computer 102, a faceup printer 103, and a facedown printer 104 are connected to the network. The faceup printer stacks printing paper sheets with their printing surfaces facing up when discharging the printing paper sheets. To the contrary, the facedown printer stacks printing paper sheets with their printing surfaces facing down. More specifically, the facedown printer discharges paper sheets in the order to input document pages. The faceup printer discharges paper sheets in an order reverse to the order to input document pages. Although a printer having either mechanism may be employed, this embodiment uses a printer switchable between the two mechanisms.

Figure 2:
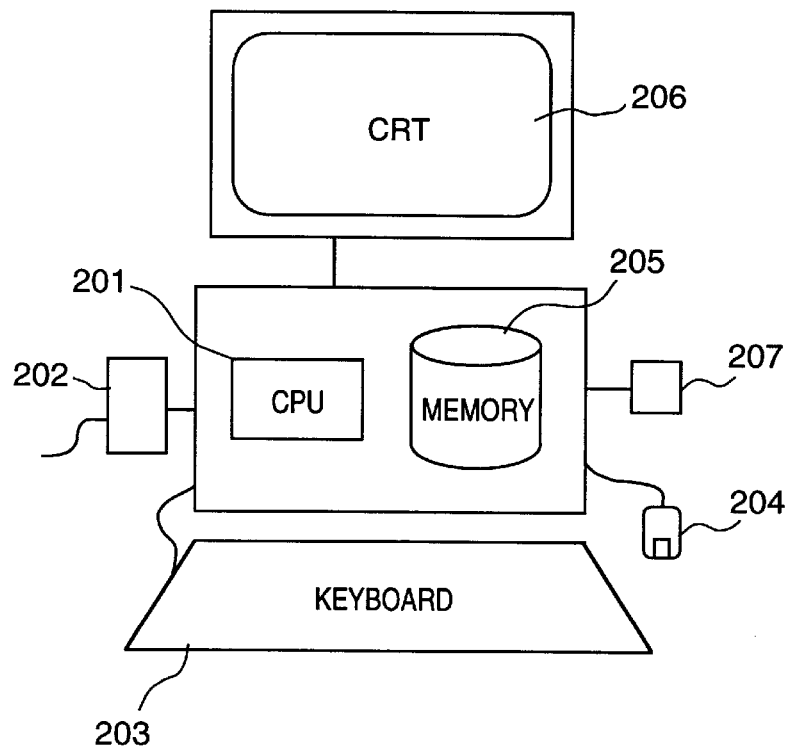
FIG. 2 is a block diagram showing a computer used in the embodiment of the present invention.

FIG. 2 is a block diagram showing the arrangement of the computer 101 or 102 used in this embodiment.

The main part of this computer is constituted by a central processing unit (CPU) 201 for controlling the overall computer, an external interface 202 for connecting the network and the printer, a keyboard 203 and a pointing device 204 for the operator to operate, a memory 205 storing a program to be executed by the CPU 201, data, and the like, and a data input device 207, such as a magneto-optical disk or a floppy disk, for externally supplying a program and data.

Figure 3:
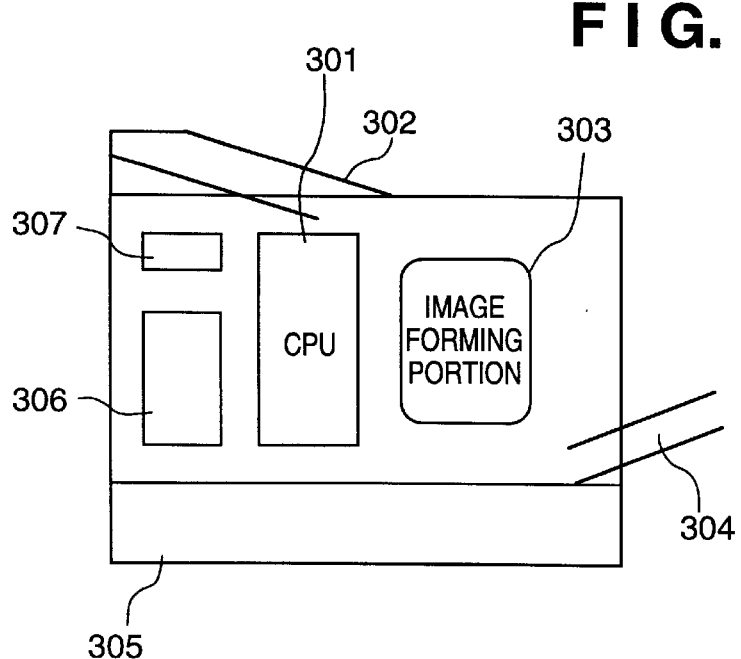
FIG. 3 is a block diagram showing a printer used in the embodiment of the present invention.

FIG. 3 is a block diagram showing the arrangement of the printer 103 or 104 used in this embodiment.

The main part of this printer is constituted by a central processing unit (CPU) 301 for controlling the overall printer, a facedown sheet discharge portion 302 for discharging a printing paper sheet with its printing surface facing down, an image forming portion 303 for forming an image on the printing paper sheet on the basis of image data, a faceup sheet discharge portion 304 for discharging the printing paper sheet with its printing surface facing up, a printing sheet cassette 305 for supplying printing paper sheets, a data buffer 306 for storing printing data received from the host computer, and an external interface 307 for connecting the network or the host computer.

Figure 13:
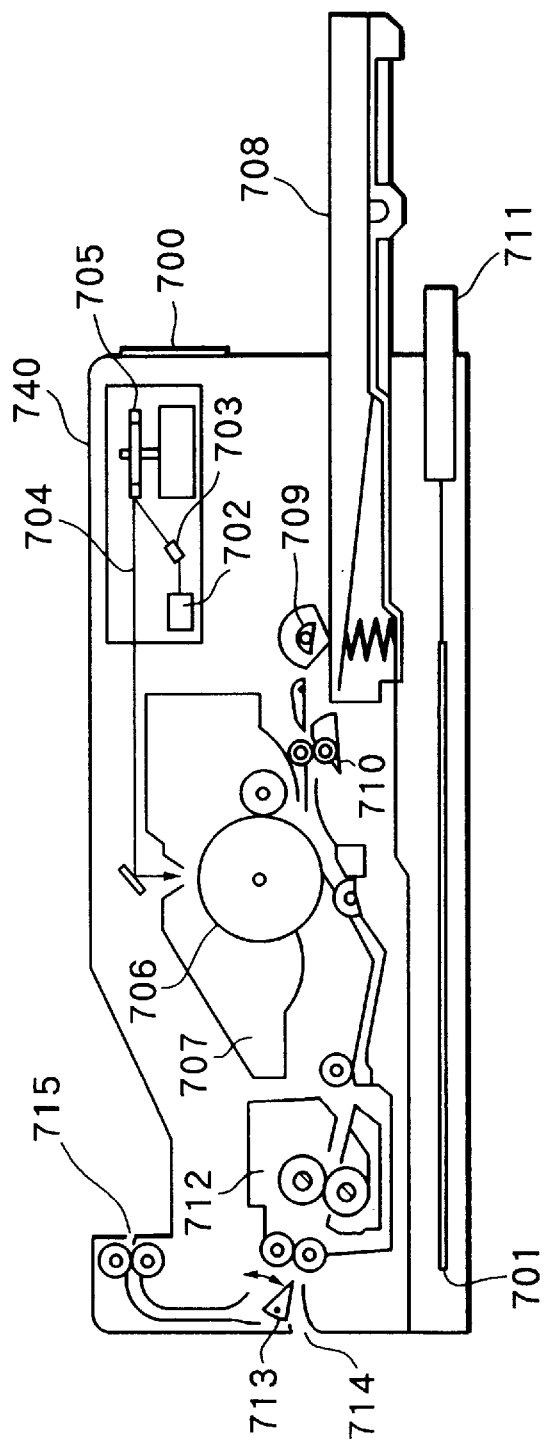
FIG. 13 is a sectional view showing a laser beam printer used in the embodiments.

FIG. 13 is a sectional view showing a laser beam printer used as the printer in FIG. 3 to form an image by electrophotography using a laser.

Referring to FIG. 13, an LBP main body 740 forms an image on a printing paper sheet as a printing medium on the basis of a supplied character pattern or the like. An operation panel 700 comprises an operation switch, an LED display device, and the like. A printer control unit 701 controls the overall LBP 740 and analyzes character pattern information and the like. This printer control unit 701 mainly converts character pattern information into a video signal, and outputs the signal to a laser driver 702. The printer control unit 701 can be connected to an external memory 711 for supplying font data, an emulation program for a page description language, and the like.

The laser driver 702 is a circuit for driving a semiconductor laser 703. The laser driver 702 switches the ON/OFF state of a laser beam 704 from the semiconductor laser 703 in accordance with an input video signal. The laser beam 704 is oscillated by a polygon mirror 705 in the right-and-left direction to scan an electrostatic drum 706, thereby forming an electrostatic latent image of a character pattern on the electrostatic drum 706. This latent image is developed by a developing unit 707 around the electrostatic drum 706, and then transferred onto a printing paper sheet. The printing paper sheet is a cut sheet. The cut printing paper sheet is stored in a paper sheet cassette 708 mounted on the LBP 740, fed into the printer through a pickup roller 709 and a convey roller 710, and supplied to the electrostatic drum 706.

A toner image transferred to the printing paper sheet is heated by a fixing portion 712 and fixed on the printing paper sheet. When a wedge 713 is directed up, the image-formed printing paper sheet is discharged from a faceup discharge portion 714 with its printing surface facing up; when the wedge 713 is directed down, the printing paper sheet is discharged from a facedown discharge portion 715 with its printing surface facing down.

Figure 4:
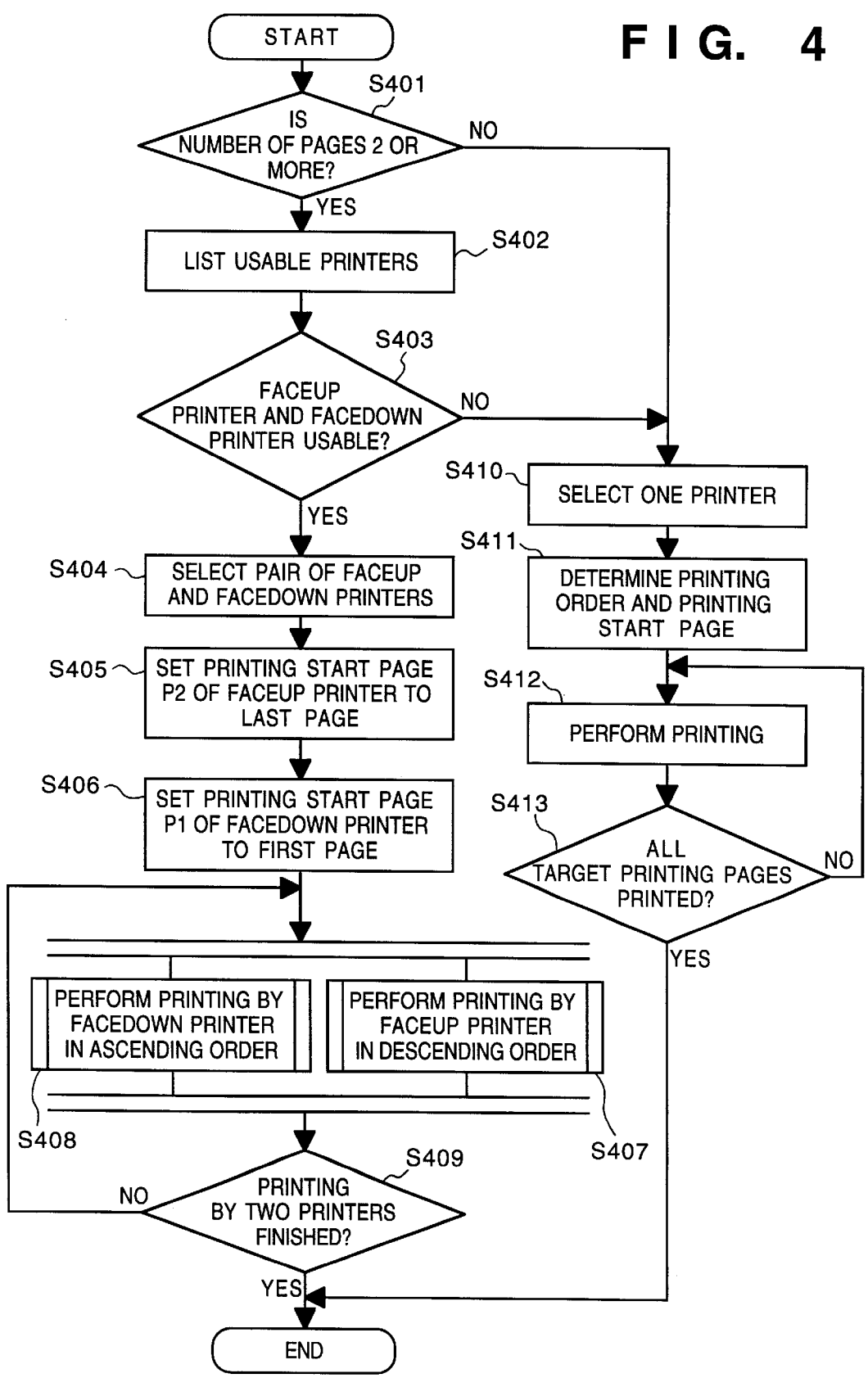
FIG. 4 is a flow chart showing processing of the first embodiment.

FIG. 4 is a flow chart showing printing control processing of the host computer 101 in the system of FIG. 1. This procedure is realized by executing a program, stored in the memory 205, by the central processing unit 201.

When printing is to be performed by the computer 101, the central processing unit 201 checks whether the number of pages of target printing data is two or more (S401). If YES in step S401, currently usable printers in the network system are listed (S402), and displayed on a display 206. It is checked whether, of the printers listed in step S402, one faceup printer and one facedown printer can be used (S403). This determination is performed on the basis of the preset state of each printer, i.e., whether the printer is used as a faceup or facedown printer.

If NO in step S401 or step S403, one printer is selected from the printers listed in step S402 (S410). The printing start page and the printing order of pages are determined in accordance with the sheet discharge direction of the printer selected in step S410 (S411). That is, if the selected printer is a facedown printer, printing data are printed from the first page of the printing data in ascending order; if the selected printer is a faceup printer, printing data are printed from the last page of the printing data in descending order.

The selected printer is caused to perform printing in accordance with the printing start page and printing order of target printing pages which are determined in step S411 (S412). It is checked whether all the target printing pages are printed (S413). If YES in step S413, the processing ends; if NO, the flow returns to step S412.

If YES in step S403, printing data are divided and printed by a plurality of printers. First, a pair of faceup and facedown printers 103 and 104 are selected from the usable printers listed in step S402 (S404). The printing start page of the selected faceup printer 103 is set to the last page of target printing pages (S405). The printing start page of the facedown printer 104 is set to the first page of the target printing pages (S406). Even when the operator selects an output printer from the printers displayed on the display 206, priority is given to selection in step S404 and setting in steps S405 and S406.

Data are sent to the respective printers such that the faceup printer 103 prints printing data from the end in the descending order (S407) and the facedown printer 104 prints printing data from the start in the ascending order (S408). FIG. 4 shows steps S407 and S408 being performed in parallel. Under a multi-task OS, these steps may be performed parallel. Under a single task OS, e.g., pages may be alternately sent to the respective printers one by one.

After the respective printers start printing, it is checked whether both the printers have finished printing (S409). If YES in step S409, the processing ends; if NO, the flow returns to step S407 to successively perform printing processing.

Figure 5:
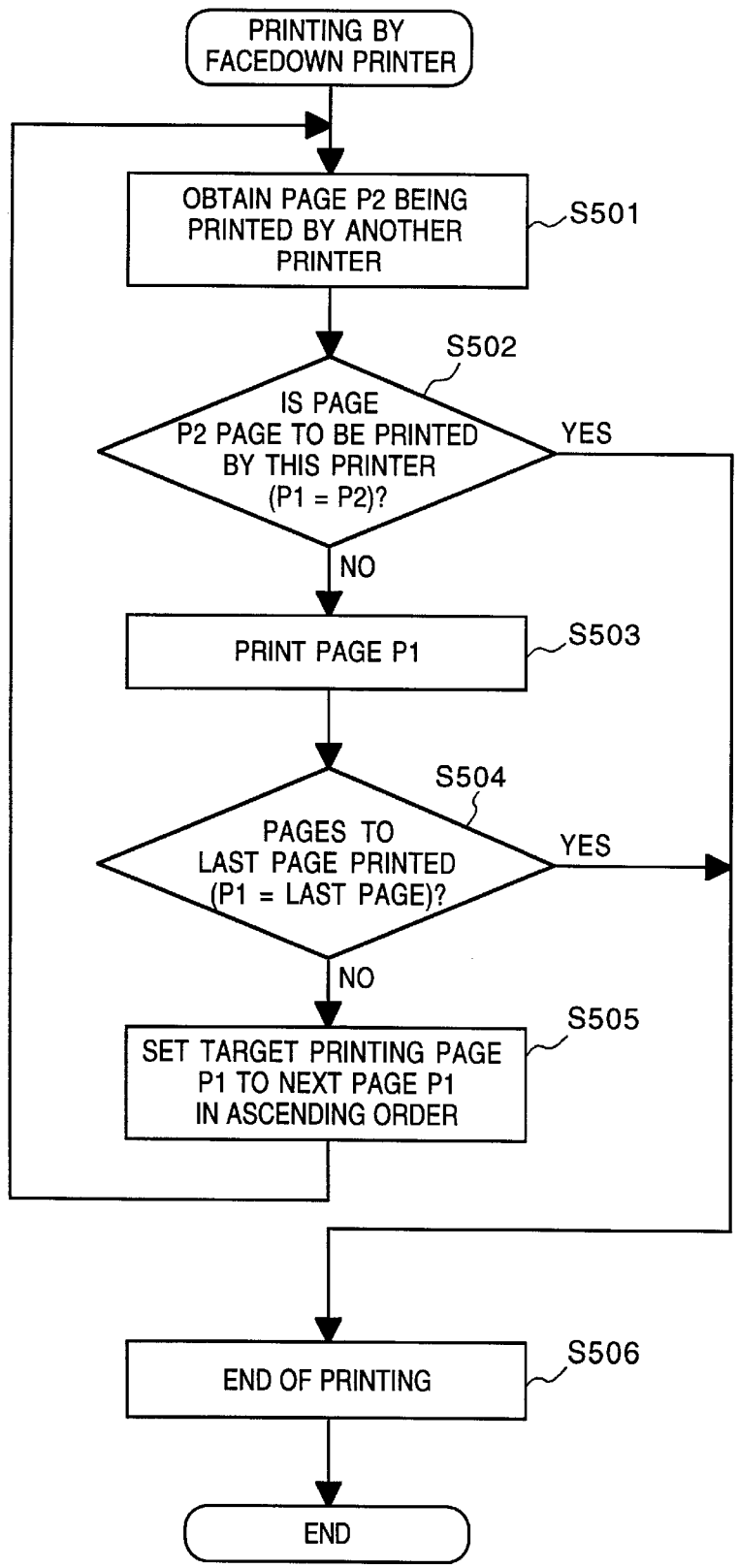
FIG. 5 is a flow chart showing printing processing of a facedown printer in the first embodiment.

FIG. 5 is a flow chart showing in detail printing request processing to the facedown printer 104 applied in step S407. Note that reference symbols P1 and P2 denote variables representing page numbers to be printed by the facedown printer 104 and the faceup printer 103, respectively. The areas of P1 and P2 are respectively ensured in the memory.

First, page number P2 being printed by the faceup printer 103 which prints the same printing data is obtained (S501). It is checked whether page number P2 is the same as page number P1 to be printed by the facedown printer (S502). If P1=P2, it can be determined that the page to be printed by the facedown printer is printed by the faceup printer. Therefore, if YES in step S502, it can be determined that all printing data are printed by the printers, and the printing processing ends (S506).

If NO in step S502, printing data of page P1 is sent to the facedown printer so as to print page P1 (S503).

Upon sending the printing data of page P1 in step S503, it is checked whether printing data to the last page are printed, i.e., P1=the last page number (S504). If YES in step S504, the processing ends (S506); if NO, the page number of a page next to the page printed in step S503 is set as new P1 (S505), and the flow returns to step S501. For example, for a consecutive document, 1 is added to the page number to obtain new P1.

With the above procedure, the facedown printer can print and discharge a target document from the first page to a page printed by the faceup printer in an order without rearrangement.

Figure 6:
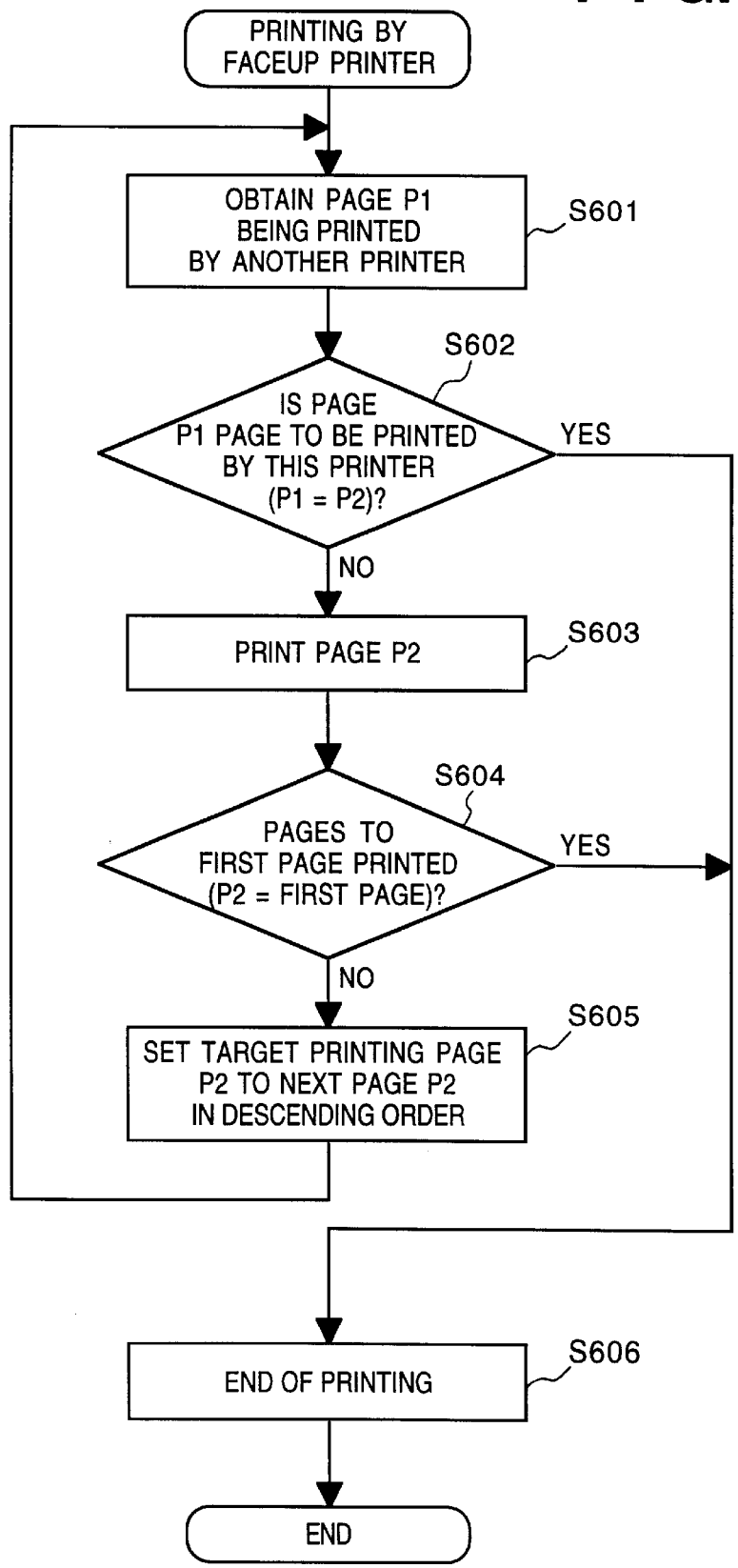
FIG. 6 is a flow chart showing printing processing of a faceup printer in the first embodiment.

FIG. 6 is a flow chart showing printing request processing to the faceup printer 103 applied in step S408.

First, page number P1 being printed by the facedown printer 104 which prints the same printing data is obtained (S601). It is checked whether page number P1 is the same as page number P2 to be printed by the faceup printer 103 (S602). If YES in step S602, the printing processing ends (S606); if NO, printing data of target printing page P2 is sent to the printer (S603).

After printing in step S603 is complete, it is checked whether printing data to the first page are printed (S604). If YES in step S604, the processing ends (S606); if NO, the page number of a page before the page printed in step S603 is set as new P2 (S605), and the flow returns to step S601. For example, for a consecutive document, 1 is subtracted from the page number to obtain new P2.

With the above procedure, the faceup printer can print and discharge a target document from the last page to a page printed by the facedown printer in an order without rearrangement.

When the procedures in FIGS. 5 and 6 are performed parallel to print one document, printing from the end of the document by the faceup printer and printing from the start of the document by the facedown printer are finished almost simultaneously regardless of a difference in performance between the two printers. That is, load can be optimally distributed without overloading either printer. Accordingly, a high-speed printing output can be realized, and printed printing paper sheets need not be rearranged.

Figure 14:
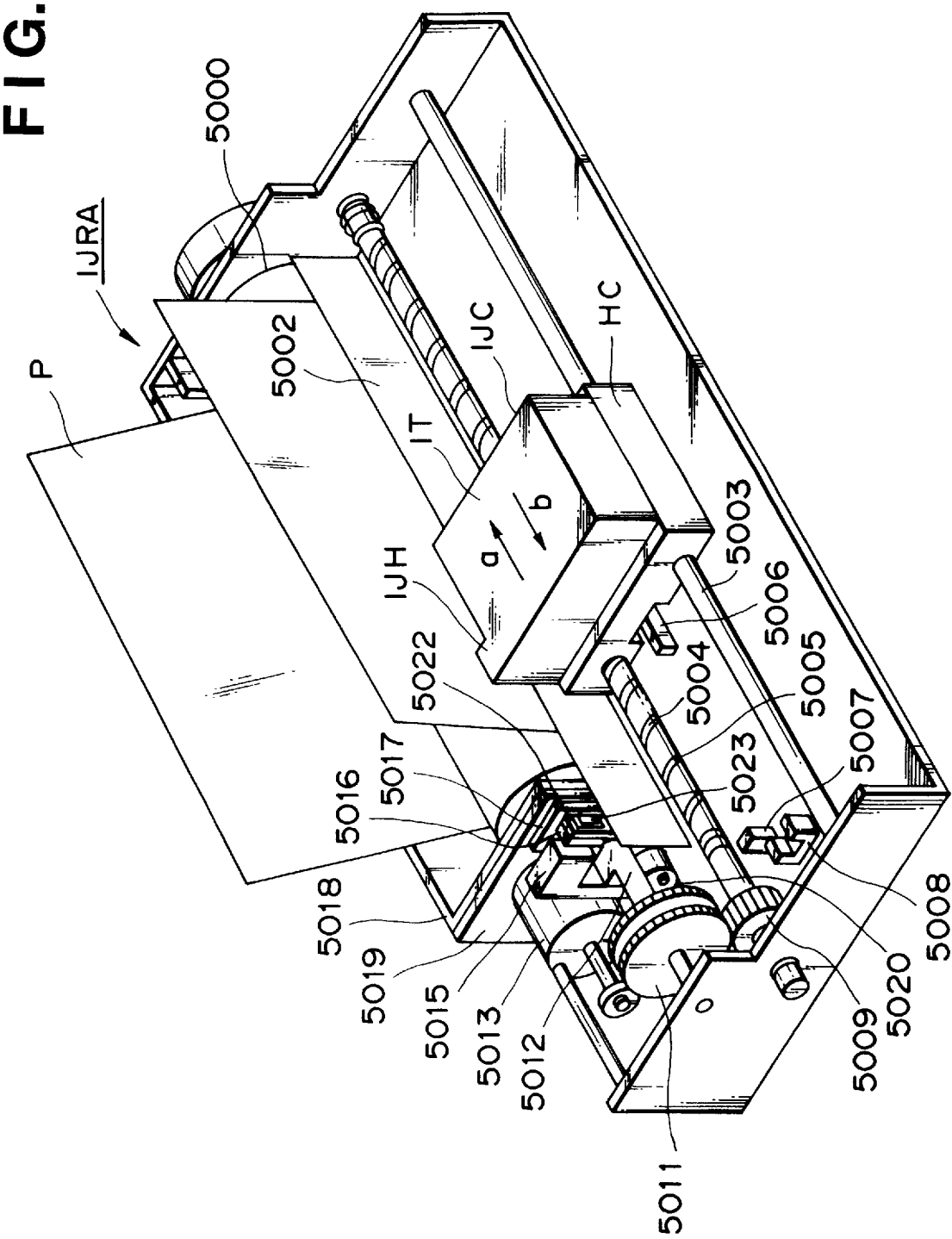
FIG. 14 is a sectional view showing an ink-jet printer.

Note that the printer need not be of an LBP scheme. FIG. 14 shows an example of an engine of an ink-jet scheme.

Referring to FIG. 14, a carriage HC engages with a spiral groove 5004 of a lead screw 5005, which rotates via driving force transmission gears 5011 and 5009 in cooperation with the forward/reverse rotation of a driving motor 5013, and has a pin (not shown). The carriage HC is reciprocally moved in the directions of arrows a and b. An ink-jet cartridge IJC is carried on the carriage HC. A paper pressing plate 5002 presses a paper sheet against a platen 5000 along the moving direction of the carriage. Photocouplers 5007 and 5008 serve as home position detection means for confirming the presence of a lever 5006 of the carriage in the corresponding region, and performing, e.g., the switching operation of the rotation direction of the motor 5013. A support member 5016 supports a cap member 5022 that caps the front surface of the print head. A suction portion 5015 is a means for sucking the interior of this cap, and attains suction recovery of the print head via an intra-cap opening 5023. A member 5019 allows a cleaning blade 5017 to be movable in the back-and-forth direction. These members are supported by a main body support plate 5018. The blade is not limited to this specific one, but a known cleaning blade can be applied to this embodiment, needless to say. A lever 5021 is a lever for initiating suction of suction recovery. The lever 5021 moves upon movement of a cam 5020 which engages with the carriage, and its movement is controlled by a known transmission means such as clutch switching by the driving force from a driving motor.

The printer of the above ink-jet scheme can also constitute the printing system of this embodiment. The printing mechanism of the printer according to this embodiment can employ a printer of a scheme other than the above schemes.

[Second Embodiment]

The same effect can be obtained even when the network system in the first embodiment is applied to a case wherein a pair of faceup and facedown printers are not simultaneously used at the start of printing.

Figure 7:
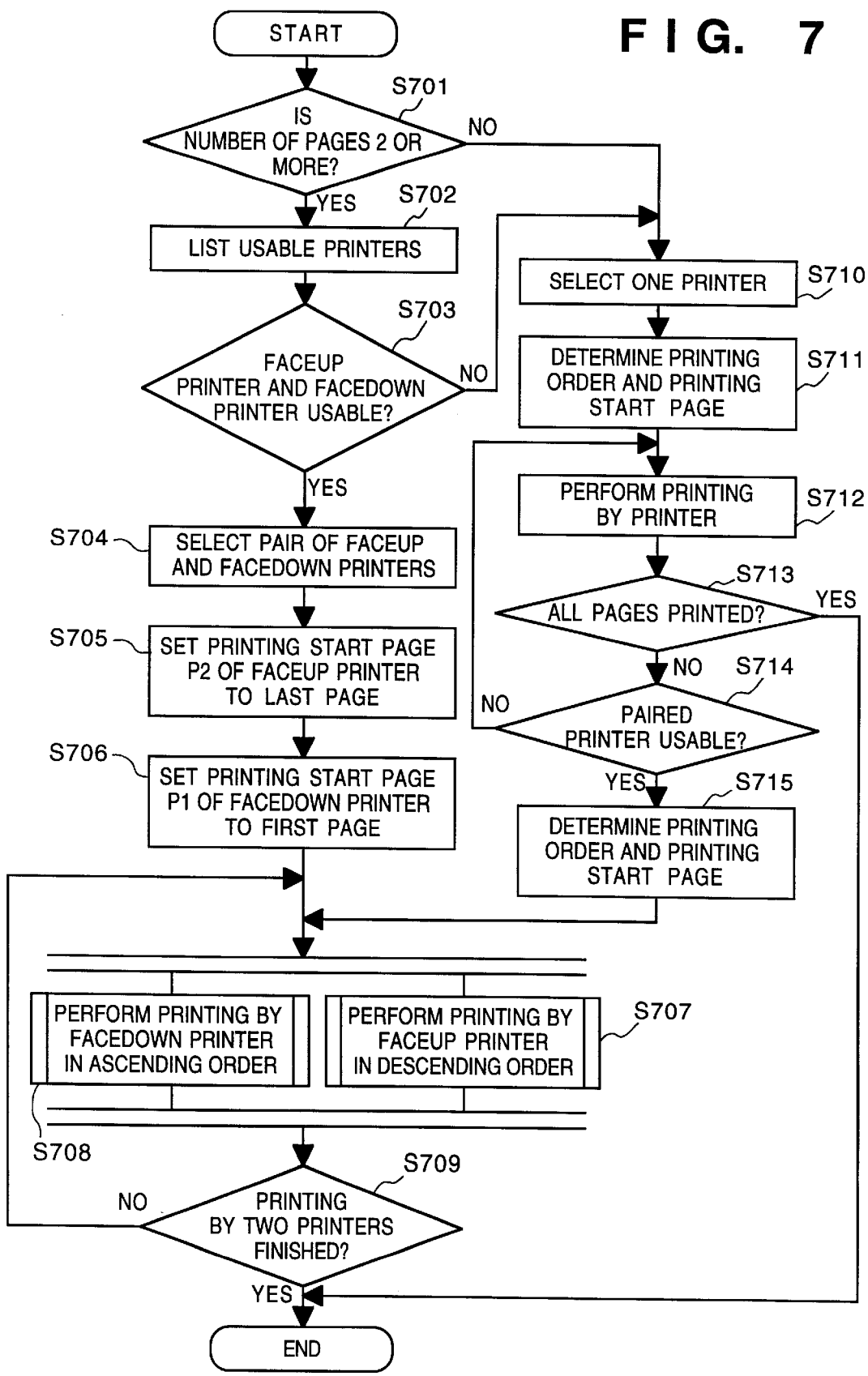
FIG. 7 is a flow chart showing printing control processing of the second embodiment.

FIG. 7 is a flow chart showing printing processing of a host computer in the second embodiment. The host computer which executes this processing is a computer 101 included in the network system in FIG. 1.

First, a central processing unit 201 of the computer 101 checks whether the number of pages of target printing data is two or more (S701). If YES in step S701, currently usable printers in the network system are listed (S702). It is checked whether, of the printers listed in step S702, one faceup printer and one facedown printer can be used (S703).

If YES in step S703, printing data are divided and printed by a plurality of printers. First, a pair of faceup and facedown printers are selected from the usable printers listed in step S702 (S704). The printing start page of a faceup printer 103 is set to the last page of printing data (S705). The printing start page of a facedown printer 104 is set to the first page of printing data (S706). The facedown printer 103 is caused to print the printing data in the descending order (S707). The facedown printer 104 is caused to print the printing data in the ascending order (S708). After the respective printers start printing, it is checked whether the two printers finish printing (S709). If YES in step S709, the processing ends; if NO, the flow returns to step S707 to successively perform printing processing. Note that the processes in steps S707 and S708 are the same as those in FIGS. 5 and 6.

If NO in step S701 or step S703, one printer is selected from the printers listed in step S702 (S710). The printing start page and the printing order of printing data are determined in accordance with the sheet discharge direction of the printer selected in step S710 (S711). That is, if the selected printer is a facedown printer, printing data are printed from the first page of the printing data in the ascending order; if the selected printer is a faceup printer, printing data are printed from the last page of the printing data in descending order.

Printing is performed in accordance with the printing start page and printing order of the printing data which are determined in step S711 (S712). It is checked whether all the printing data are printed (S713). If YES in step S713, the processing ends. If NO, it is checked whether a printer paired with the printer selected in step S710 is usable (S714). That is, if a facedown printer is usable for a faceup printer as the printer selected in step S710, or a faceup printer is usable for a facedown printer as the printer selected in step S710, determination in step S714 is YES.

If YES in step S714, printing is set to be performed in descending order from the last page when the usable printer is a faceup printer, or in ascending order from the first page when the usable printer is a facedown printer (S715). The processing shifts to step S707.

With the above procedure, even if neither the faceup nor facedown printers are used at the start of printing, a printer having been unusable is allowed to perform a printing output when the printer becomes usable. When printing is started by the two printers, printing data can be distributed and printed from the start and the end of a document by the two printers, and the two printers can finish printing simultaneously, as in the first embodiment. Therefore, a high efficiency of printing processing and a high utilization efficiency of network resources can be attained.

[Third Embodiment]

In this embodiment, even if one printer stops due to a failure in the system of the first and second embodiments, the other printer can automatically print remaining pages. This embodiment eliminates a failure by executing printing request processing to a facedown printer in step S407 of FIG. 4 and step S707 of FIG. 7 by a procedure in FIG. 8, and executing printing request processing to a faceup printer in step S408 of FIG. 4 and step S708 of FIG. 7 by a procedure in FIG. 9. A description of the same part as in the first or second embodiment will be omitted.

Figure 8:
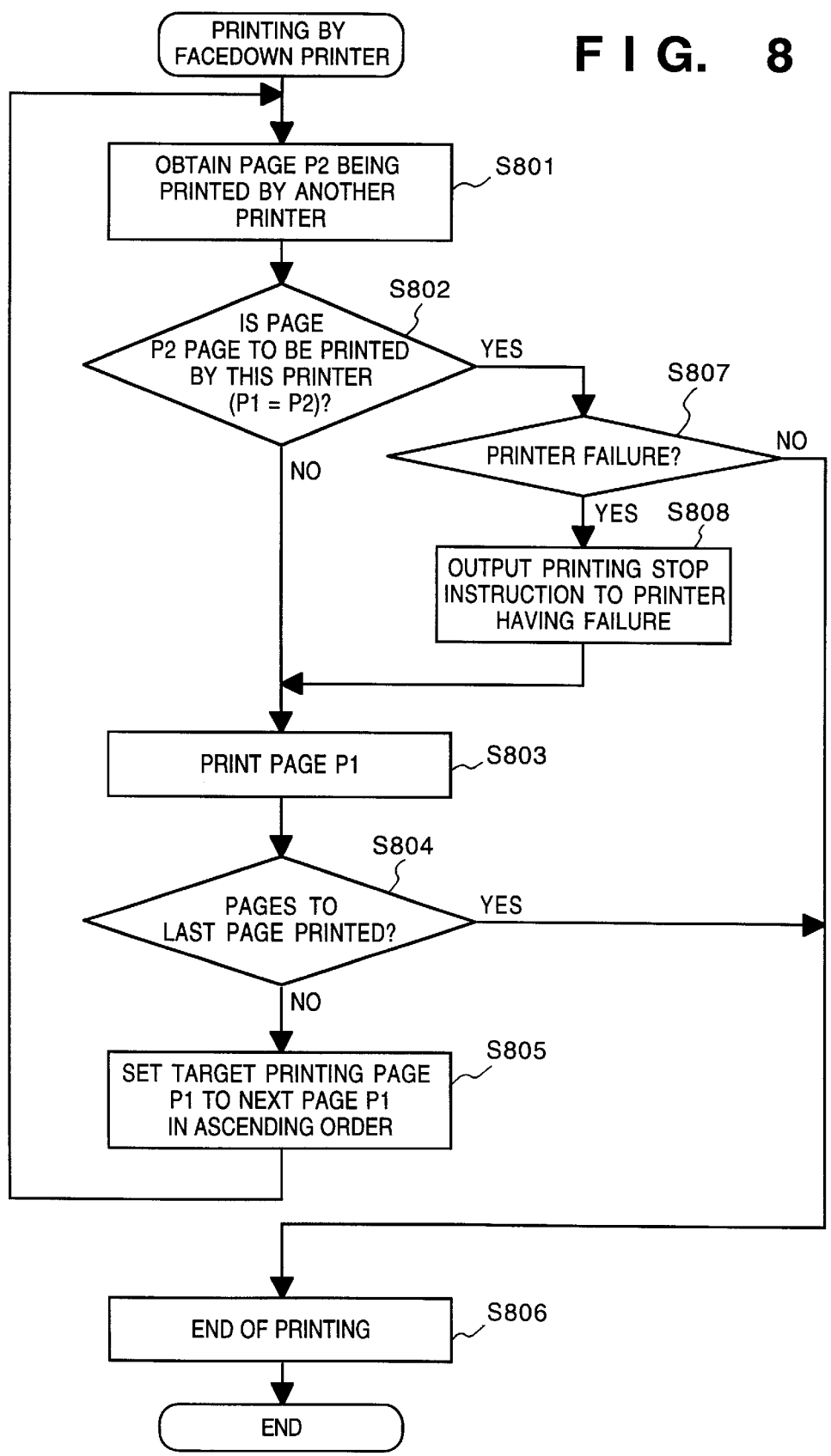
FIG. 8 is a flow chart showing printing processing of a facedown printer in the third embodiment.

FIG. 8 is a flow chart showing printing request processing to a facedown printer 104 in this embodiment.

First, page number P2 being printed by a faceup printer 103 which prints the same printing data is obtained (S801). It is checked whether page number P2 is the same as page number P1 to be printed by a facedown printer 104, i.e., P1=P2 (S802). If NO in step S802, page P1 is printed by the facedown printer 104 (S803). Upon completion of printing in step S803, it is checked whether printing data to the last page are printed (S804). If YES in step S804, the processing ends (S806); if NO, target printing page P1 is set to a page next to the page printed in step S803 (S805), and the flow returns to step S801.

If YES in step S802, it is checked whether a failure such as an error or a paper sheet jam occurs in the other paired printer during printing of page P1 (S807). If YES in step S807, a printing stop instruction is output to the faceup printer determined to have an error (S808). The processing returns to step S803 to print page P1 by the facedown printer.

By checking an error in this manner, even when an error occurs in one printer, a page having the error during printing can be printed by the other printer free from any error.

Figure 9:
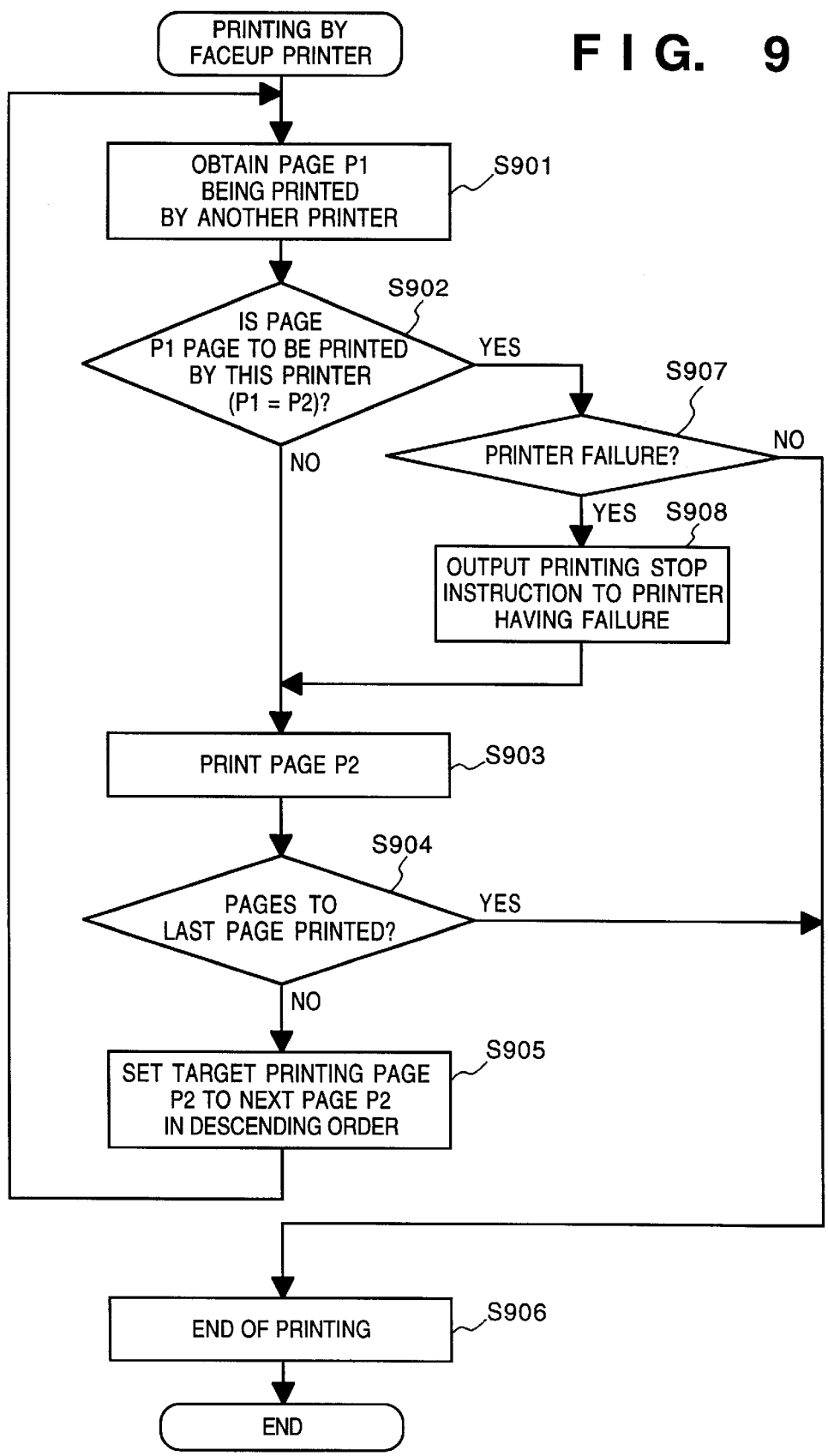
FIG. 9 is a flow chart showing printing processing of a facedown printer in the third embodiment.

FIG. 9 is a flow chart showing printing request processing to the faceup printer 103 in this embodiment.

First, page number P1 being printed by the facedown printer 104 which prints the same printing data is obtained (S901). It is checked whether page number P1 is the same as page number P2 to be printed by the faceup printer 103. If NO in step S902, page P2 is printed by the faceup printer 103 (S903). Upon completion of printing in step S902, it is checked whether printing data to the last page are printed (S904). If YES in step S904, the processing ends (S906); if NO, target printing page P2 is set to a page before the page printed in step S903 (S905), and the flow returns to step S901.

If YES in step S902, it is checked whether a failure such as an error or a paper sheet jam occurs in the facedown printer 104 during printing of page (S907). If YES in step S907, a printing stop instruction is output to the printer 104 determined to have an error (S908), and the processing shifts to step S903. In step S903, the page which cannot be printed by the paired facedown printer 104 due to an error is printed by the faceup printer 103.

With the above procedures, errors in a pair of printers are checked. When an error occurs in one printer, a page having the error can be printed by the other printer free from any error.

[Fourth Embodiment]

Figure 12:
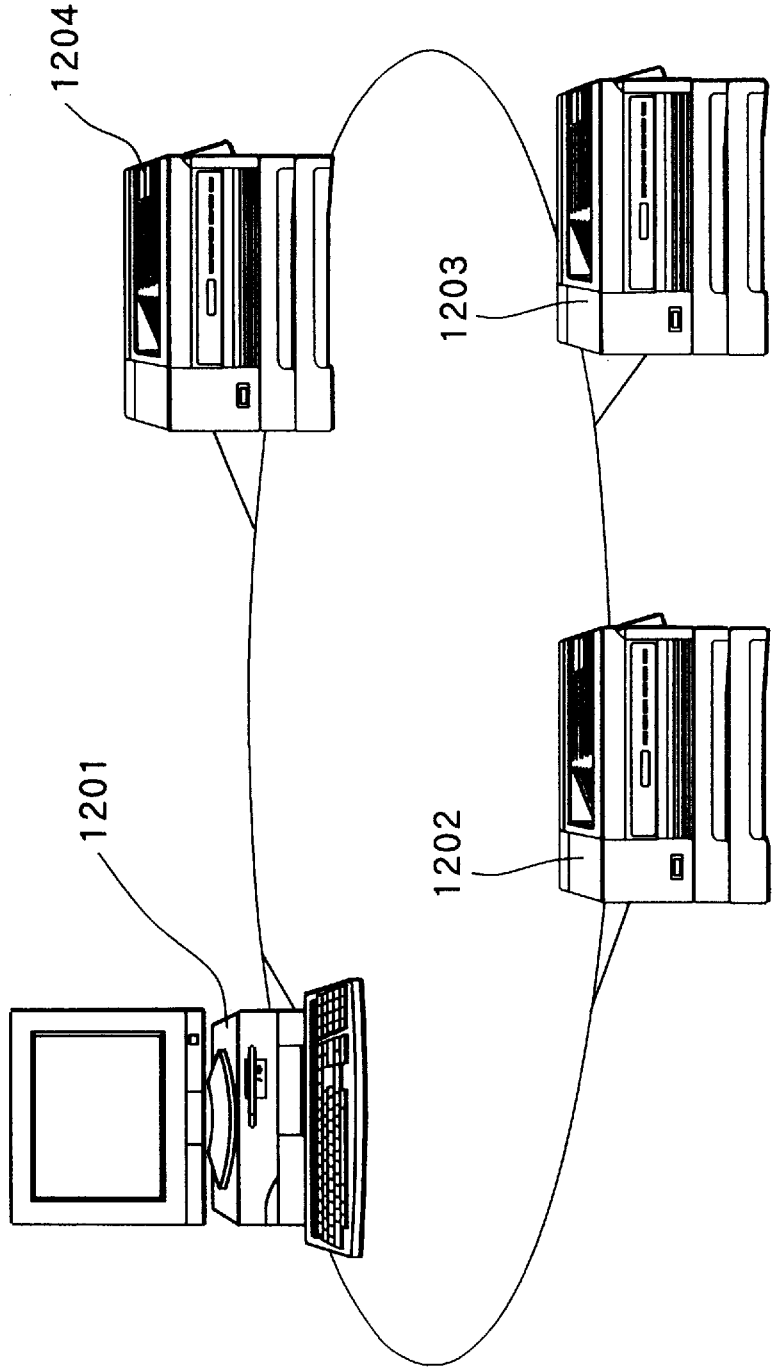
FIG. 12 is a block diagram showing a system according to the fourth and fifth embodiments.

This embodiment exemplifies a system for dividing one document by using three or more printers and printing the document by a plurality of printers. A network system in this embodiment is prepared by connecting at least three printers, as shown in FIG. 12.

Figure 10:
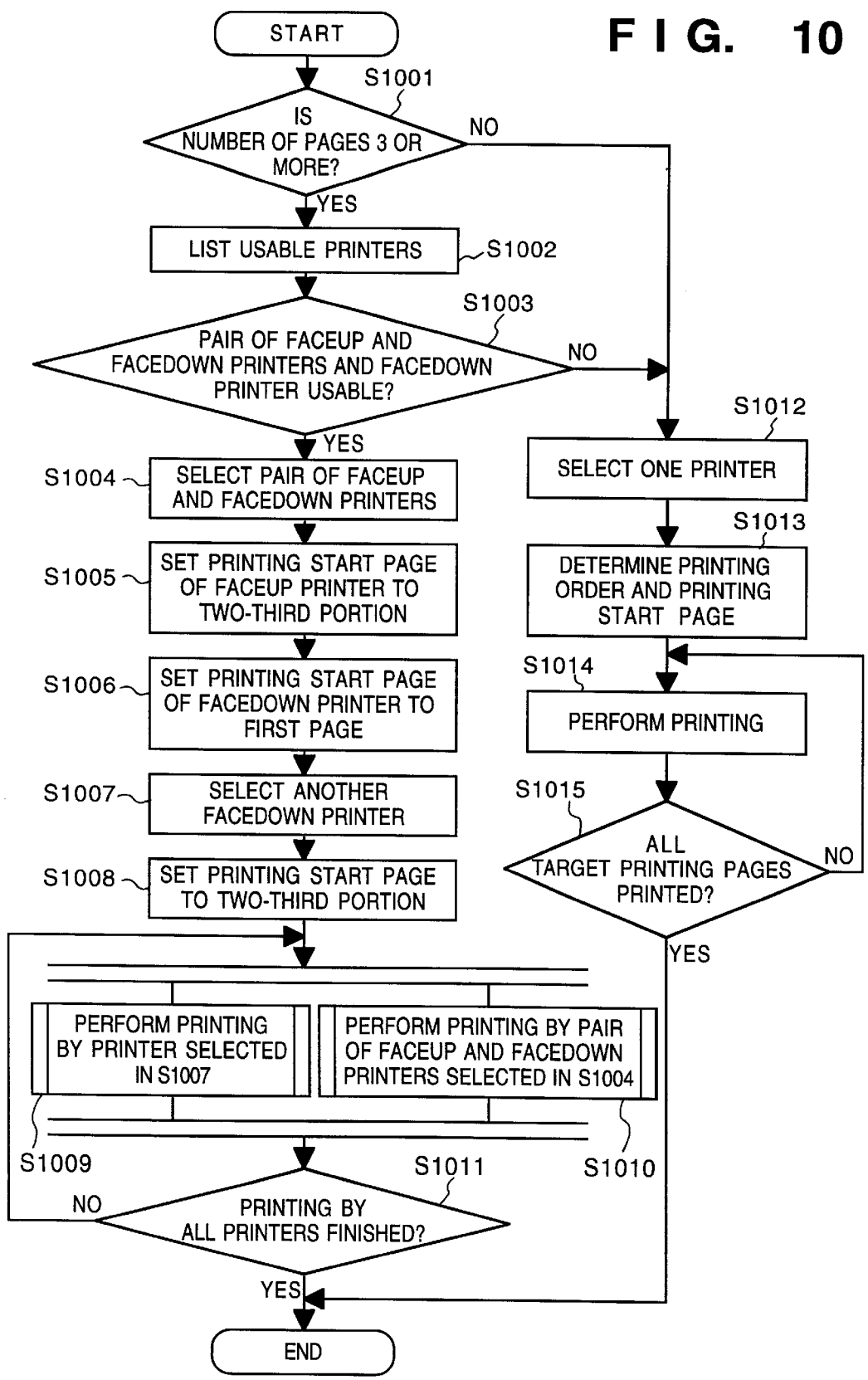
FIG. 10 is a flow chart showing printing control processing using three printers in the fourth embodiment.

FIG. 10 shows a control procedure by a host computer 1201 which causes the three printers to perform printing. The host computer 1201 has an arrangement shown in FIG. 2.

First, it is checked whether the number of target printing pages is three or more (S1001). If YES in step S1001, currently usable printers are listed (S1002), and displayed on a display 206. It is checked whether, of the printers listed in step S1002, a pair of faceup and facedown printers and another facedown printer can be used (S1003).

If NO in step S1001 or S1003, one printer is selected from the printers listed in step S1002 (S1012). The printing start page and the printing order of pages are determined in accordance with the sheet discharge direction of the printer selected in step S1012 (S1013). That is, if the selected printer is a facedown printer, printing data are printed from the first page of printing pages in the ascending order; if the selected printer is a faceup printer, printing data are printed from the last page in the descending order. Printing is performed in accordance with the printing start page and printing order of target printing pages which are determined in step S1013 (S1014). It is checked whether all the target printing pages are printed (S1015). If YES in step S1015, the processing ends; if NO, the flow returns to step S1014.

If YES in step S1003, printing data are divided and printed by a plurality of printers. First, a pair of faceup and facedown printers are selected from the usable printers listed in step S1002 (S1004). The printing start page of a faceup printer 103 is set to the two-third portion from the start of the printing data (S1005). The start page of the facedown printer is set to the first page of the printing data (S1006).

Then, a facedown printer is selected from the printers listed in S1002, except for the one selected in step S1004 (S1007). The printing start page of the facedown printer selected in step S1007 is set to the two-third portion from the start of the printing data, and the printing order is set in ascending order (S1008). In selecting a pair of faceup and facedown printers in step S1004, even if the operator selects an output printer from the printers displayed on the display 206, priority is given to selection in step S1004 and setting in steps S1005 and S1006.

Printing data are printed from the start to the two-third portion of target printing pages by the pair of faceup and facedown printers selected in step S1004 (S1010). Printing data are printed from the two-third portion to the end by the facedown printer selected in step S1007 (S1009). It is checked whether all the printers finish printing (S1011). If YES in step S1011, the processing ends; if NO, the flow returns to step S1009 to successively perform printing. The processing in step S1010 is equivalent to processing of performing parallel steps S407 and S408 in the first embodiment or steps S707 and S708 in the second embodiment.

In this embodiment, the facedown printer is selected in step S1007, and the start page is set to the two-third portion of the all pages in step S1008 to perform printing from this page in ascending order. Similarly, if a faceup printer is selected in step S1007 to perform printing from the last page in descending order, the same effect can be obtained.

This embodiment exemplifies the case using the three printers. If the present invention is applied to a case using four or more printers, the same effect can be obtained. In this case, a plurality of pairs of facedown and faceup printers are prepared. As for a printer not to be paired, the printing start page and the printing order are determined to perform printing in descending order from the last page of a printing portion assigned to the printer if the printer is a faceup printer, or to perform printing in ascending order from the first page of the printing portion assigned to the printer if the printer is a facedown printer. As for the paired printers, a printing portion is assigned to each pair to perform control described in the first to third embodiments for each pair.

[Fifth Embodiment]

The fifth embodiment exemplifies a network system for efficiently performing printing by using, of printers used for division printing, printers which cannot constitute a pair of faceup and facedown printers.

Figure 11:
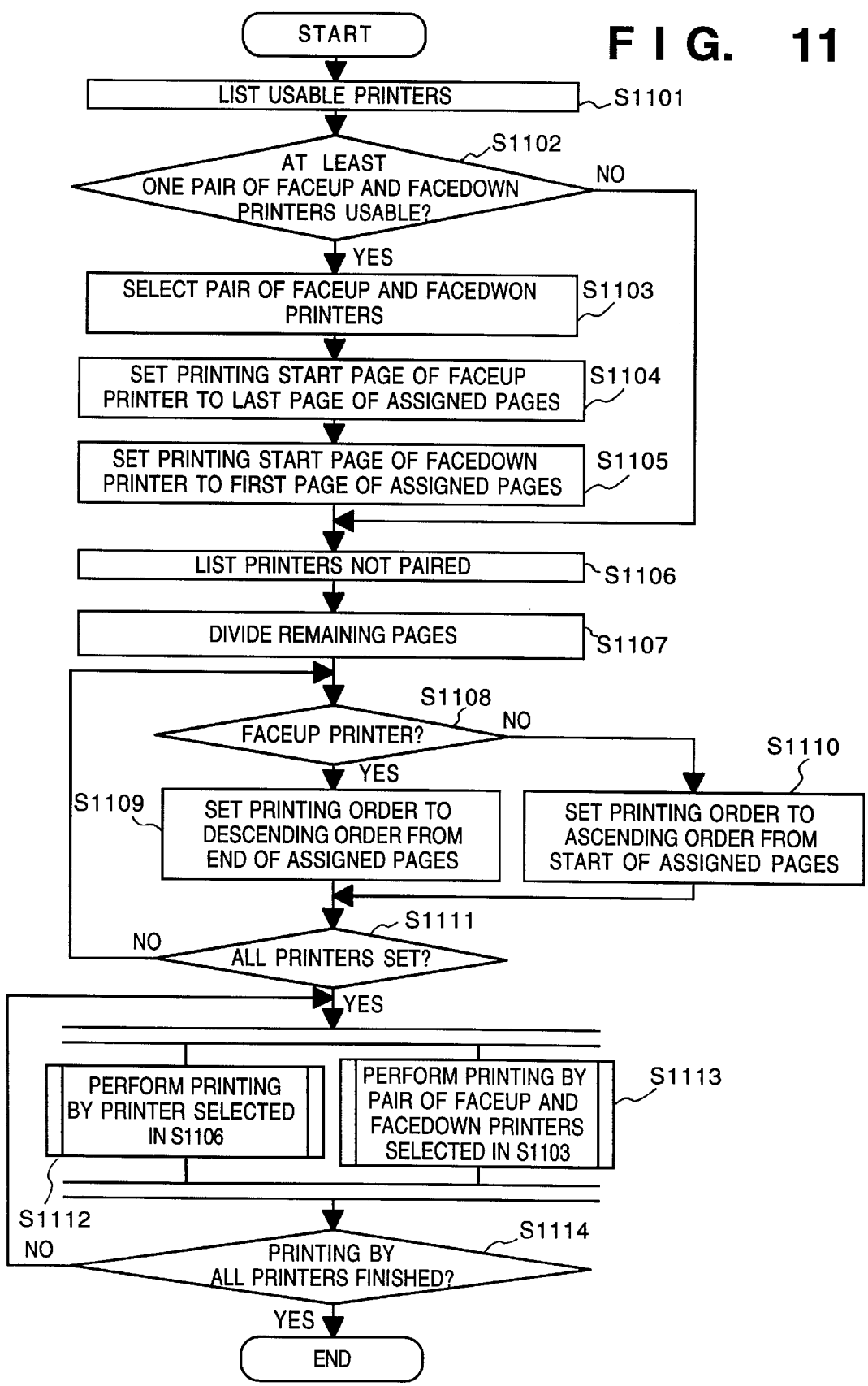
FIG. 11 is a flow chart showing processing for allowing a printer which cannot constitute a pair of faceup and facedown printers to perform printing.

The system has an arrangement shown in FIG. 12. Each printer is controlled as shown in FIGS. 5 and 6 in the first embodiment or FIGS. 8 and 9 in the third embodiment. FIG. 11 is a flow chart showing processing of determining a printer on the network used for printing, and determining the printing start page and the printing order.

First, currently usable printers are listed (S1101), and displayed on a display 206. It is checked whether, of the printers listed in step S1101, at least one pair of faceup and facedown printers can be used (S1102).

If NO in step S1102, the flow skips steps S1103 to S1105.

If YES in step S1102, printing data are divided and printed by selected printers. First, a target printing document is divided by the number of usable printers listed in step S1101, and one section is assigned to each pair of printers (S1103). Note that when the number of pages of the document is smaller than the number of printers, unpaired printers are preferentially eliminated from the listed printers to adjust the number of printers to the number of pages. Of the divided document, two consecutive sections are assigned to each pair of printers, and remaining sections are assigned to unpaired printers. The printing start page of the faceup printer of each pair is set to the last page of assigned printing pages (S1104). The start page of the facedown printer is set to the first page of the target printing pages (S1105).

Of the printers used for printing, printers which cannot constitute a pair of faceup and facedown printers are listed (S1106). Of printing data, remaining pages which are not printed by the pair of faceup and facedown printers are divided by the number of printers listed in step S1106 to assign the data to the respective printers (S1107).

One printer is selected from the printers listed in step S1106, and it is checked whether the printer is a faceup printer (S1108). If YES in step S1108, the printer is set to perform printing from the last page of assigned pages in descending order (S1109). If NO in step S1108, the printer is set to perform printing from the first page of the assigned pages in ascending order (S1110) After step S1109 or S1110, it is checked whether setting of all the printers listed in step S1106 is complete (S1111). If YES in step S1111, the processing ends; if NO, the flow returns to S1108 to repeatedly perform steps S1108 to S1111 or all the listed printers.

In this manner, the printing start page and the printing order are determined for both a paired printer and an unpaired printer.

Upon setting, an assigned portion is sent to each printer in accordance with the setting to perform printing (S1112 and S1113). This processing is performed parallel for the respective printers. The processing performed in step S1113 is equivalent to that in FIGS. 5 and 6 or that in FIGS. 8 and 9. In step S1112, only assigned printing data are sent to each printer in the set order from the set printing start page.

In step S1114, it is checked whether all the printers finish printing. If YES, the printing processing ends.

With the above procedure, the system according to this embodiment can perform a printing output by using printers as fully as possible. In this case, since each printer performs printing in the order of a faceup or facedown printer, a complete document is obtained by simply stacking printed matters in order without rearrangement.

[Another Embodiment]

Note that the present invention may be applied to either a system constituted by a plurality of equipments (e.g., a host computer, an interface device, a reader, a printer, and the like), or an apparatus consisting of a single piece of equipment (e.g., a copying machine, a facsimile apparatus, or the like).

The objects of the present invention are also achieved by supplying a storage medium which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the program code read out by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer and receives the program code read out from the storage medium.

Figure 15:
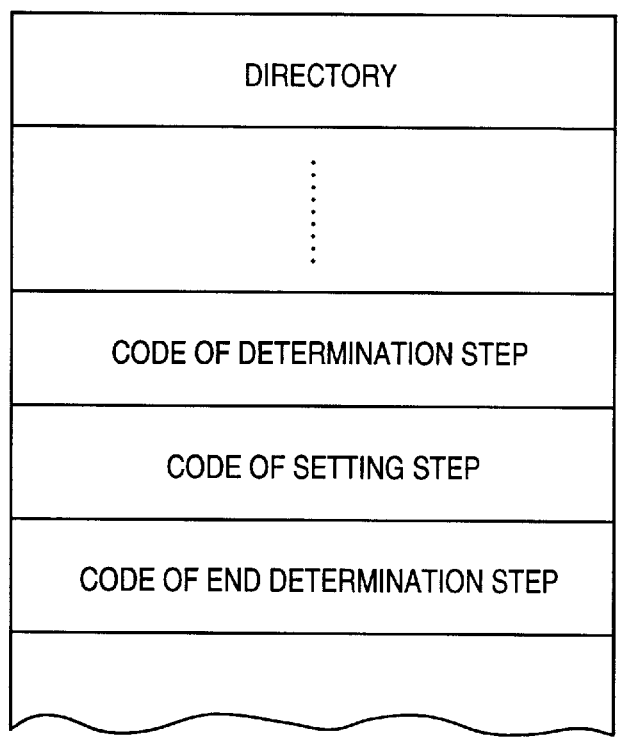
FIG. 15 is a view showing a memory map on a medium storing a program according to the present invention.

When the present invention is applied to the storage medium, the storage medium stores program codes corresponding to the flow charts described above. In short, the storage medium stores respective modules shown in an example of a memory map in FIG. 15.

More specifically, the storage medium stores the program codes of respective modules, i.e., the code of a determination step of determining the presence/absence of a usable pair of at least one faceup printer and one facedown printer, the code of a setting step of, when the usable pair exists, assigning target printing data to the pair, setting the faceup printer of this pair so as to perform printing in descending order from the last page of the target printing data by this pair, and setting the facedown printer so as to perform printing in ascending order from the first page of the target printing data by this pair, and the code of an end determination step of determining a point at which the printing data printed by the paired faceup and facedown printers in accordance with the setting in the setting step are consecutive, and ending the printing at this point.

As has been described above, the printing control method and apparatus according to the present invention have the following effects.

First, the number of target printing pages can be optimally distributed in printing a document by a plurality of printers, and paper sheets need not be rearranged upon completion of printing.

Second, in printing a document by a plurality of printers, when a failure occurs in any one of the printers to stop printing, remaining pages can be automatically printed by another printer. Even when the printer having stopped recovers from the failure to restart printing, processing is not affected.

Third, in printing a document by a plurality of printers, when a failure occurs in any one of the printers, remaining pages can be automatically printed by another printer.

Fourth, in printing a document by a plurality of printers, pages assigned to a printer which cannot constitute a pair of faceup and facedown printers need not be rearranged upon completion of printing.

As many apparently widely different embodiments of the present invention can be made without departing from the spirit and scope thereof, it is to be understood that the invention is not limited to the specific embodiments thereof except as defined in the appended claims.

What is claimed is:

1. A printing control method of performing printing using at least one of a faceup printer for discharging a paper sheet with a printing surface facing up, and a facedown printer for discharging a paper sheet with a printing surface facing down, comprising:

a determination step of determining a presence/absence of a usable pair constituted by one faceup printer and one facedown printer;

a setting step of, when the usable pair exists, assigning target printing data to the pair, setting said faceup printer of the pair so as to perform printing in a descending order from a last page of the target printing data of the pair, and setting said facedown printer so as to perform printing in an ascending order from a first page of the target printing data of the pair; and a end determination step of determining that outputs printed by said paired faceup printer and facedown printer are consecutive, and ending printing.

2. The method according to claim 1, wherein the setting step comprises a step of assigning all printing data to one pair of printers.

3. The method according to claim 1, wherein the end determination step comprises a step of determining that, when each of two paired printers prints a page having the same page number as that of a page printed by the other printer, outputs from said respective printers are consecutive.

4. The method according to claim 1, further comprising a control step of, when it is determined in the determination step that no usable pair of faceup and facedown printers exist, selecting one printer, assigning all printing data, and performing printing in the descending order from a last page of the printing data as a printing start page when said printer is a faceup printer, or performing printing in the ascending order from a first page of the printing data as the printing start page when said printer is a facedown printer.

5. The method according to claim 4, wherein the control step comprises a step of determining that a second printer paired with said selected printer is usable during printing by said printer, assigning printing data not to be printed by said selected printer when said second printer is usable, and setting said second printer so as to perform printing in the descending order from a last page of the printing data as the printing start page when said second printer is a faceup printer, or so as to perform printing in the ascending order from a first page of the printing data as the printing start page when said second printer is a facedown printer, and the end determination step comprises a step of determining an end of printing by said selected printer and said second printer.

6. The method according to claim 1, wherein the end determination step comprises a step of checking whether a failure occurs in each of said two paired printers while a page to be printed by one printer is printed by the other printer, and causing said printer free from any failure to print the page when it is determined that the failure occurs.

7. The method according to claim 1, wherein the setting step comprises a step of, when it is determined that a plurality of pairs are usable, assigning target printing pages to said respective pairs.

8. The method according to claim 1, wherein the setting step comprises a step of also assigning printing data to unpaired printers, in addition to the usable pair, and setting each unpaired printer so as to perform printing in the descending order from a last page of the assigned printing data as a printing start page when said unpaired printer is a faceup printer, or so as to perform printing in the ascending order from a first page of the assigned printing data as the printing start page when said unpaired printer is a facedown printer.

9. The method according to claim 1, wherein the determination step comprises a step of checking whether one facedown printer is usable together with said pair of printers, and the setting step comprises the step of assigning ⅔ data to be printed to said pair of printers, and assigning remaining ⅓ data to said facedown printer so as to perform printing from a start in the ascending order.

10. A printing system for printing printing data using at least one of a faceup printer for discharging a paper sheet with a printing surface facing up, and a facedown printer for discharging a paper sheet with a printing surface facing down, comprising:

determination means for determining a presence/absence of a usable pair constituted by one faceup printer and one facedown printer;

setting means for, when the usable pair exists, assigning target printing data to the pair, setting said faceup printer of the pair so as to perform printing in a descending order from a last page of the target printing data of the pair, and setting said facedown printer so as to perform printing in an ascending order from a first page of the target printing data of the pair; and end determination means for determining that outputs printed by said paired faceup printer and facedown printer are consecutive, and ending printing.

11. The system according to claim 10, wherein said setting means assigns all printing data to one pair of printers.

12. The system according to claim 10, wherein said end determination means determines that, when each of two paired printers prints a page having the same page number as that of a page printed by the other printer, outputs from said respective printers are consecutive.

13. The system according to claim 10, further comprising control means for, when said determination means determines that no usable pair of faceup and facedown printers exist, selecting one printer, assigning all printing data, and performing printing in the descending order from a last page of the printing data as a printing start page when said printer is a faceup printer, or performing printing in the ascending order from a first page of the printing data as the printing start page when said printer is a facedown printer.

14. The system according to claim 13, wherein said control means includes means for determining that a second printer paired with said selected printer is usable during printing by said printer, assigning printing data not to be printed by said selected printer when said second printer is usable, and setting said second printer so as to perform printing in the descending order from a last page of the printing data as the printing start page when said second printer is a faceup printer, or so as to perform printing in the ascending order from a first page of the printing data as the printing start page when said second printer is a facedown printer, and said end determination means determines an end of printing by said selected printer and said second printer.

15. The system according to claim 10, wherein said end determination means checks whether a failure occurs in each of said two paired printers while a page to be printed by one printer is printed by the other printer, and causes said printer free from any failure to print the page when it is determined that the failure occurs.

16. The system according to claim 10, wherein, when it is determined that a plurality of pairs are usable, said setting means assigns target printing pages to said respective pairs.

17. The system according to claim 10, wherein said setting means also assigns printing data to unpaired printers, in addition to the usable pair, and sets each unpaired printer so as to perform printing in the descending order from a last page of the assigned printing data as a printing start page when said unpaired printer is a faceup printer, or so as to perform printing in the ascending order from a first page of the assigned printing data as the printing start page when said unpaired printer is a facedown printer.

18. The system according to claim 10, wherein said determination means checks whether one facedown printer is usable together with said pair of printers, and said setting means assigns ⅔ data to be printed to said pair of printers, and assigns remaining ⅓ data to said facedown printer so as to perform printing from a start in the ascending order.

19. A storage medium stores a program which performs printing using at least one of a faceup printer for discharging a paper sheet with a printing surface facing up, and a facedown printer for discharging a paper sheet with a printing surface facing down, the program comprising:

determination means for determining a presence/absence of a usable pair constituted by one faceup printer and one facedown printer;

setting means for, when the usable pair exists, assigning target printing data to the pair, setting said faceup printer of the pair so as to perform printing in a descending order from a last page of the target printing data of the pair, and setting said facedown printer so as to perform printing in an ascending order from a first page of the target printing data of the pair; and end determination means for determining that printing data printed by said paired faceup printer and facedown printer are consecutive, and ending printing at a point.

* * * * *

UNITED STATES PATENT AND TRADEMARK OFFICE
CERTIFICATE OF CORRECTION

PATENT NO. : 5,881,212

DATED : March 9, 1999

INVENTOR(S) : HIROYASU MORITA

It is certified that error appears in the above-identified patent and that said Letters Patent is hereby corrected as shown below:

COLUMN 2

Line 8, "determining" should read --determining a--; and
    Line 46, "determining" should read --determining a--.

COLUMN 5

Line 30, "formed" should read --formed in--.

COLUMN 7

Line 16, "the" should be deleted;
    Line 18, "the" should be deleted; and
    Line 31, "the" should be deleted.

UNITED STATES PATENT AND TRADEMARK OFFICE
CERTIFICATE OF CORRECTION

PATENT NO.  : 5,881,212

DATED       : March 9, 1999

INVENTOR(S) : HIROYASU MORITA

It is certified that error appears in the above-identified patent and that said Letters Patent is hereby corrected as shown below:

COLUMN 10

```
Line 35, "(S1110)" should read --(S1110).--;
Line 39, "or" should read --for--; and
Line 45, "parallel" should read --in parallel--.
```

COLUMN 12

```
Line 20, "a" should read --an--.
```

UNITED STATES PATENT AND TRADEMARK OFFICE
CERTIFICATE OF CORRECTION

PATENT NO.   : 5,881,212

DATED        : March 9, 1999

INVENTOR(S) : HIROYASU MORITA

It is certified that error appears in the above-identified patent and that said Letters Patent is hereby corrected as shown below:

<u>COLUMN 14</u>

Line 33, "stores" should read --for storing--.

Signed and Sealed this

Thirty-first Day of October, 2000

*Attest:*

Q. TODD DICKINSON

*Attesting Officer*      *Director of Patents and Trademarks*